United States Patent
Rabe et al.

(10) Patent No.: US 10,343,086 B2
(45) Date of Patent: Jul. 9, 2019

(54) COMPACT FLOTATION UNIT HAVING MULTIPLE VANES DISPOSED AROUND A CYLINDER USED FOR WASTE COLLECTION

(71) Applicant: SCHLUMBERGER NORGE AS, Stavanger (NO)

(72) Inventors: Karsten Rabe, Porsgrunn (NO); Michel Iver Tveitan Maelum, Porsgrunn (NO); Lars Hardli, Porsgrunn (NO)

(73) Assignee: SCHLUMBERGER NORGE AS, Stavanger (NO)

(*) Notice: Subject to any disclaimer, the term of this patent is extended or adjusted under 35 U.S.C. 154(b) by 370 days.

(21) Appl. No.: 15/101,194

(22) PCT Filed: Dec. 4, 2014

(86) PCT No.: PCT/US2014/068478
§ 371 (c)(1),
(2) Date: Jun. 2, 2016

(87) PCT Pub. No.: WO2015/085023
PCT Pub. Date: Jun. 11, 2015

(65) Prior Publication Data
US 2016/0303492 A1    Oct. 20, 2016

Related U.S. Application Data

(60) Provisional application No. 61/911,886, filed on Dec. 4, 2013.

(51) Int. Cl.
*B01D 17/02*    (2006.01)
*B01D 21/00*    (2006.01)
(Continued)

(52) U.S. Cl.
CPC ...... *B01D 17/0211* (2013.01); *B01D 17/0205* (2013.01); *B01D 17/0214* (2013.01);
(Continued)

(58) Field of Classification Search
CPC ............ B01D 17/0211; B01D 17/0214; B01D 17/0205; B01D 17/0217; B01D 19/00;
(Continued)

(56) References Cited

U.S. PATENT DOCUMENTS 1,565,318 A    12/1925    Fisher
1,940,762 A *  12/1933    Mahone ............. B01D 17/0211
                                                    210/708

(Continued)

FOREIGN PATENT DOCUMENTS

DE            705339 C      4/1941
DE        10230881 A1      2/2004
(Continued)

OTHER PUBLICATIONS

Proposed Examiner's Amendment cover letter (15_101_194_Proposed_Examiner_s_Amendment) (Year: 2019).*

*Primary Examiner* — Joseph W Drodge
(74) *Attorney, Agent, or Firm* — Hauptman Ham, LLP (57) ABSTRACT

An apparatus, such as a compact flotation unit, may include a tank having a fluid inlet. A cylinder may be disposed within the tank and have an open end. A first guide vane may be disposed about the cylinder, with the first guide vane having a portion axially aligned with the fluid inlet. A second guide vane may be disposed about the cylinder adjacent the open end thereof and may include a first end and a second end, with the first end of the second guide vane being axially offset from the second end of the second guide vane.

19 Claims, 6 Drawing Sheets

(51) Int. Cl.
   *B03D 1/14* (2006.01)
   *B04C 5/10* (2006.01)
   *C02F 1/40* (2006.01)
   *B03D 1/24* (2006.01)
   *B04C 5/103* (2006.01)
   *B04C 5/13* (2006.01)
   *C02F 101/32* (2006.01)

(52) U.S. Cl.
   CPC ..... *B01D 17/0217* (2013.01); *B01D 21/0039* (2013.01); *B01D 21/0087* (2013.01); *B03D 1/1412* (2013.01); *B03D 1/1418* (2013.01); *B03D 1/247* (2013.01); *B04C 5/103* (2013.01); *B04C 5/13* (2013.01); *C02F 1/40* (2013.01); *C02F 2101/32* (2013.01)

(58) Field of Classification Search
   CPC ............ B01D 19/0042; B01D 19/0094; B01D 21/0039; B01D 21/0042; B01D 21/0084; B01D 21/0087; B01D 21/10; B01D 21/24; B01D 21/2405; B01D 21/2427; B01D 21/2444; B04C 5/13; B04C 5/103; B04C 2003/006; B03D 1/247; B03D 1/1418; B03D 1/1412; B03D 1/1493; C02F 1/40; C02F 2101/32; C02F 1/14; C02F 1/38; C10G 31/10
   USPC ................ 196/46; 96/216, 220; 95/260–262; 208/187; 210/512.1, 521, 532.1, 537, 210/703, 787, 788, 801
   See application file for complete search history.

(56) References Cited

U.S. PATENT DOCUMENTS

| | | | |
|---|---|---|---|
| 2,509,172 A * | 5/1950 | Schreier | B01D 3/26 261/108 |
| 3,988,132 A | 10/1976 | Oranje | |
| 5,403,473 A | 4/1995 | Moorehead et al. | |
| 5,403,486 A * | 4/1995 | Leung | B04B 1/20 210/380.1 |
| 5,840,198 A * | 11/1998 | Clarke | B01D 17/0211 210/802 |
| 7,144,503 B2 | 12/2006 | Oserod | |
| 7,867,310 B2 | 1/2011 | Baten | |
| 8,425,777 B2 * | 4/2013 | Folkvang | B01D 3/14 208/187 |
| 8,440,077 B2 | 5/2013 | Oserod | |
| 8,734,577 B2 * | 5/2014 | Naess | B01D 17/0211 96/174 |
| 9,284,199 B2 * | 3/2016 | Rabe | B01D 17/0205 |
| 2007/0051673 A1 * | 3/2007 | Samways | B04B 5/005 210/512.1 |
| 2007/0277967 A1 | 12/2007 | Oserod | |
| 2010/0006476 A1 * | 1/2010 | Folkvang | B01D 3/14 208/188 |
| 2012/0125201 A1 * | 5/2012 | Naess | B01D 17/0211 96/174 |
| 2012/0137888 A1 * | 6/2012 | Naess | B01D 17/0217 96/174 |
| 2013/0207283 A1 * | 8/2013 | Rabe | B01D 17/0205 261/74 |
| 2014/0209465 A1 * | 7/2014 | Whitney | C10G 33/06 204/555 |

FOREIGN PATENT DOCUMENTS

| | | |
|---|---|---|
| EP | 0140402 A2 | 5/1985 |
| EP | 0436973 A2 | 7/1991 |
| EP | 1782870 A1 | 5/2007 |
| EP | 2263766 A1 | 12/2010 |
| EP | 2353687 A1 | 8/2011 |
| RU | 2379119 C1 | 1/2010 |
| WO | 2011128824 A1 | 10/2011 |
| WO | 2013/043354 * | 3/2013 |

OTHER PUBLICATIONS

Body of Proposed Examiner's Amendment (15_101_194_Body_of_Exmr_Amdt) (Year: 2019).*
International Preliminary Report on Patentability issued in the related PCT Application PCT/US2014/068478, dated Jun. 7, 2016 (7 pages).
Extended search report issued in the related EP Application 14867374.2, dated Jul. 4, 2017 (9 pages).
International Search Report and Written Opinion dated Mar. 31, 2015 in the related international application PCT/US2014/068478.

* cited by examiner

COMPACT FLOTATION UNIT HAVING MULTIPLE VANES DISPOSED AROUND A CYLINDER USED FOR WASTE COLLECTION

TECHNICAL FIELD

The present disclosure relates to a compact flotation unit, and more particularly to a compact flotation unit using gas bubble flotation for separating oil from water.

BACKGROUND

An oil well may produce a mixture including oil, water and gas. Various systems have been developed for separating the oil and gas from the water.

For example, compact flotation units have been in use since 2001, and in some cases can adequately serve the needs for removal of oil and gas from water at various desired points in the production process. However, some oil may remain in the water despite the use of a compact flotation unit. For example, in some cases, a portion of smaller gas bubbles may exist at the bottom of a compact flotation unit that, because of countercurrent water flow, may not rise to the surface for removal. These small bubbles may have been in contact with oil droplets, and thus may be carrying oil.

Figure 11A:
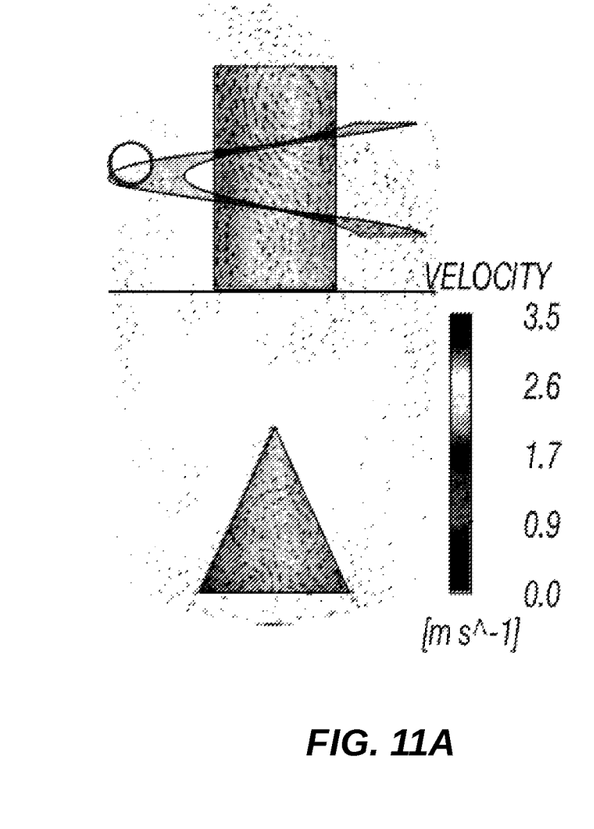
FIG. 11A is a flow direction and velocity diagram illustrating fluid flow in prior compact flotation units.
Figure 11B:
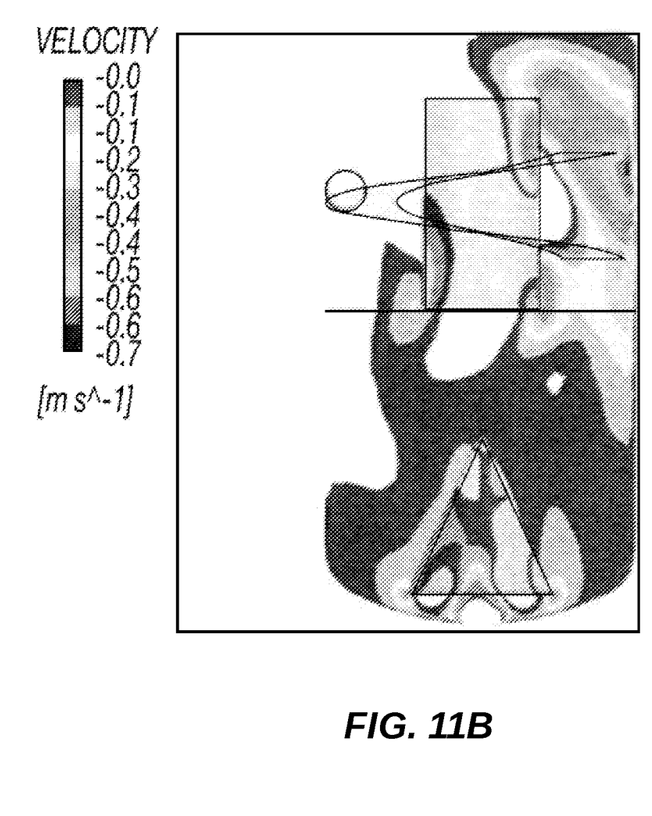
FIG. 11B is a velocity contour diagram illustrating fluid flow in prior compact flotation units.

These issues are illustrated in the diagrams shown in FIGS. 11A and 11B. As shown in the flow direction and velocity diagram on FIG. 11A, in some areas, the flow of the flow becomes uneven and turbulent as it flows downward. This turbulent and uneven flow may result in the transport of oil carrying small bubbles toward the bottom of the compact flotation unit. The velocity contour diagram in FIG. 11B better illustrates the greater velocities in these zones of turbulent and uneven flow.

Due to ever tightening environmental regulations in some areas, newer compact flotation units able to remove at least some of these gas bubbles, and thus further reduce the amount of oil removed from water, are desirable.

SUMMARY

This section provides a general summary of the disclosure, and is not a comprehensive disclosure of its full scope or all of its features.

In one configuration, an apparatus may include a tank having a fluid inlet, with a cylinder disposed within the tank and having an open end. A first guide vane may be disposed about the cylinder, with the first guide vane having a portion axially aligned with the fluid inlet. A second guide vane may be disposed about the cylinder adjacent the open end thereof and may include a first end and a second end. The first end of the second guide vane may be axially offset from the second end of the second guide vane.

A method aspect may include accepting flow of a mixture comprising water, a hydrocarbon containing liquid not miscible with the water, and a gas through a pipeline. The hydrocarbon containing liquid and the gas may be separated from the water by feeding the mixture through an apparatus. The apparatus may include a tank having a fluid inlet in fluid communication with the pipeline and at least one fluid outlet. A cylinder may be disposed within the tank and may have an open end. A first guide vane may be disposed about the cylinder, and the first guide vane may have a portion axially aligned with the fluid inlet. A second guide vane may be disposed about the cylinder adjacent the open end thereof, and may include a first end and a second end, with the first end of the second guide vane being axially offset from the second end of the second guide vane. The method may also include expelling at least one of a portion of the gas and the hydrocarbon containing liquid from the cylinder through a discharge tube at least partially disposed within the cylinder in fluid communication with the at least one fluid outlet.

A compact flotation unit disclosed herein may include a tank having a fluid inlet. A cylinder may be disposed within the tank, and may have an open end and a closed end, with the disposition of the cylinder within the tank being such that during operation, the closed end of the cylinder is below a surface of fluid within the tank. A first helical guide vane may be disposed about the cylinder and may have a substantially planar surface defining an angle with respect to a radius of a portion of the cylinder axially aligned with the fluid inlet. The fluid inlet may be shaped such that fluid entering the tank therethrough defines an angle with respect to the substantially planar surface of the first guide vane that is substantially equal to the angle defined with by the substantially planar surface with respect to the radius of the cylinder. A second guide vane may be disposed about the cylinder adjacent the open end thereof and include a first end and a second end, with the first end of the second guide vane being axially offset from the second end of the second guide vane. The second guide vane may have a substantially planar surface defining an angle with respect to a radius of the cylinder such that the substantially planar surface slops radially outwardly relative to the cylinder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Such example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

With general reference to FIGS. 1-4, a compact flotation unit constructed in accordance with the present teachings is illustrated and generally identified at reference numeral 10. The compact flotation unit 10 may be used to process and separate a mixture that includes oil, water, and gas. In this regard, the compact flotation unit 10 may have various sizes such that the compact flotation unit 10 can process mixture flow rates ranging from about one cubic meters per hour to about one thousand one hundred fifty cubic meters per hour.

The compact flotation unit 10 includes a housing or tank 12 and a discharge tube 16. In one configuration, the tank 12 is generally cylindrically shaped, including first and second axial ends 26, 28, and defining a chamber 30 therein. It will be appreciated that the tank 12 may include other shapes within the scope of the present teachings.

As illustrated, the first axial end 26 of the tank 12 includes a base portion 32 and a first outlet 34. The base portion 32 and the first outlet 34 may extend in a first axial direction from the first axial end 26 of the tank 12. In one configuration, the first outlet 34 is a water outlet in fluid communication with the chamber 30. In this regard, the first outlet 34 is generally operable to discharge water from the chamber 30. It will also be appreciated that the first outlet 34 may be operable to discharge other materials from the chamber 30. The tank 12 may include a discharge assembly 36 including a base 38 and a deflector plate 40. The discharge assembly 36 may be mounted within the chamber 30 of the tank 12. The base 38 may be cylindrically shaped and disposed adjacent the first axial end 26 of the tank 12. The base 38 may define a plurality of radially extending apertures 42 in fluid communication with the first outlet 34. The deflector plate 40 may be conically shaped. The base of the deflector plate 40 may be disposed adjacent to the base 38 of the discharge assembly 36.

The second axial end 28 of the tank 12 includes a second outlet 44. The second outlet 44 may extend in a second axial direction (opposite the first axial direction) from the second axial end 28. In one configuration, the second outlet 44 is an oil and gas outlet in fluid communication with the chamber 30. In this regard, the second outlet 44 is generally operable to discharge oil and gas from the chamber 30. It will also be appreciated that the second outlet 44 may be operable to discharge other materials from the chamber 30. It will also be appreciated that the second outlet 44 can be at any suitable location of the tank 12, and can have wall-through and vessel exits may have different mechanical designs.

The tank 12 may further include an inlet 46 and a third outlet 48. The inlet 46 may be a radially extending aperture in the sidewall of the tank 12. In one configuration, the inlet 46 is an oil, gas and water inlet in fluid communication with the chamber 30. In this regard, the inlet 46 is generally operable to dispense an oil, gas and water mixture into the chamber 30. The third outlet 48 is a radially extending aperture in the sidewall of the tank 12. It will also be appreciated that the third outlet 48 may have other locations and configurations within the scope of the present disclosure. In one configuration, the third outlet 48 is an oil and gas outlet in fluid communication with the discharge tube 16. In this regard, the third outlet 48 is generally operable to discharge oil and gas from the chamber 30. As illustrated, in one configuration, the inlet 46 is located axially above (relative to the view in FIG. 1) the third outlet 48.

Figure 3:
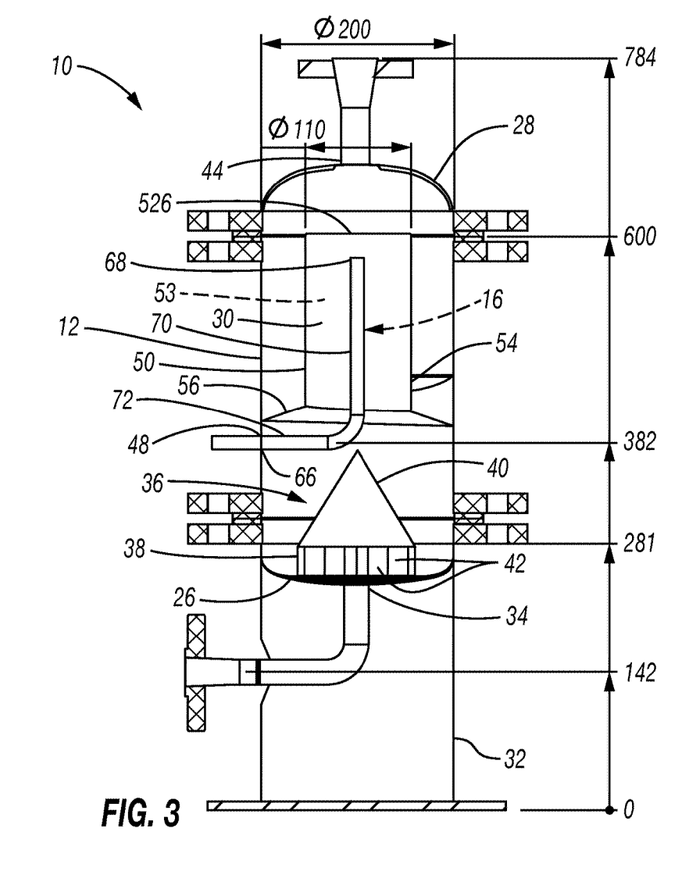
FIG. 3 is a cross-sectional view of the compact flotation unit of FIG. 1, taken through the line 3-3 of FIG. 1.
Figure 4:
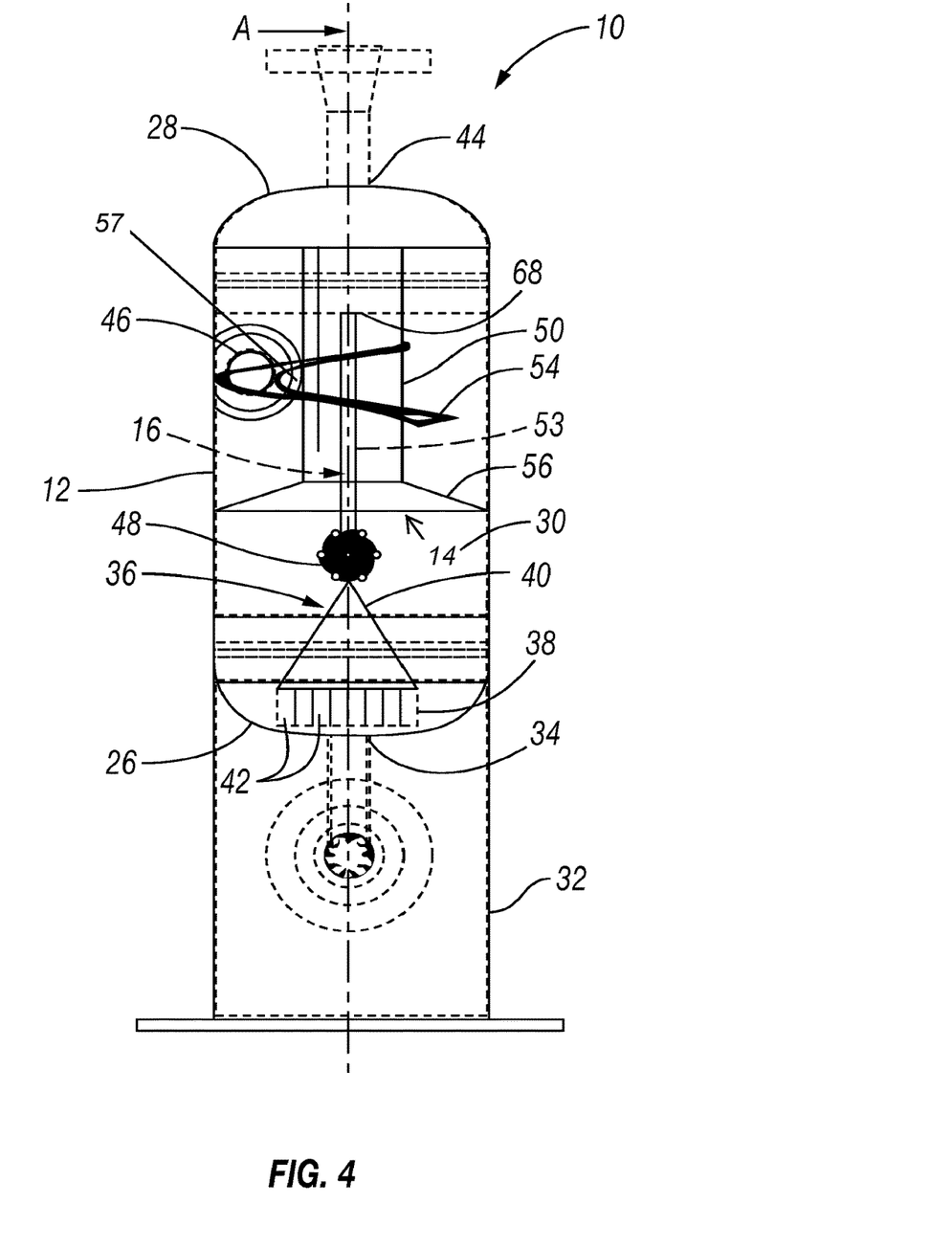
FIG. 4 is a cross-sectional view of the compact flotation unit of FIG. 1, taken through the line 4-4 of FIG. 2.
Figure 10:
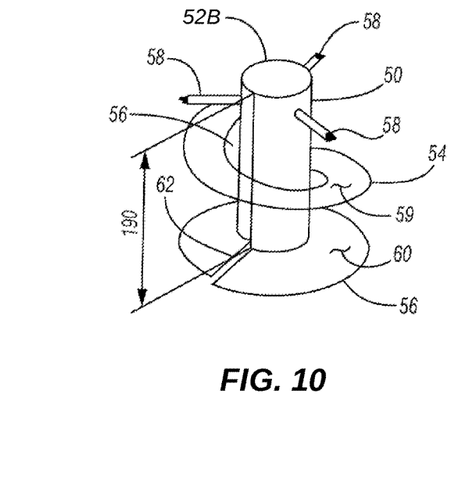
FIG. 10 is another perspective view of the inner cylinder, first guide vane, and second guide vane of the compact flotation unit of FIG. 1.

The particular reference to FIGS. 3 and 4, the separation assembly 14 is disposed within the chamber 30 of the tank 12. The separation assembly 14 includes an inner cylinder 50, first guide vane 54, a second guide vane 56, and a plurality of support arms 58. As illustrated, in one configuration, the inner cylinder 50 is substantially coaxially located within the tank 12. The inner cylinder 50 extends along its axis 190 (shown in FIG. 10) between first and second axial ends 52a, 52b, defining an inner chamber 53. The first axial end 52a may be generally open and face the first axial end 26 of the tank 12. The second axial end 52b may be closed and face the second axial end 28 of the tank.

In this regard, the second axial end 52*b* of the inner cylinder 50 may include a substantially circular portion 60 generally sealing the second axial end of the inner cylinder (shown in FIG. 11). Closing the second axial end 52*b* of the inner cylinder 50 helps to prevent the flow of water or other fluid in the first axial direction within the inner chamber 53 of the inner cylinder 50, and also allows for the formation of a gas bubble or air pocket within the inner chamber 53 adjacent to the second axial end 52*b* of the inner cylinder 50.

Figure 8:
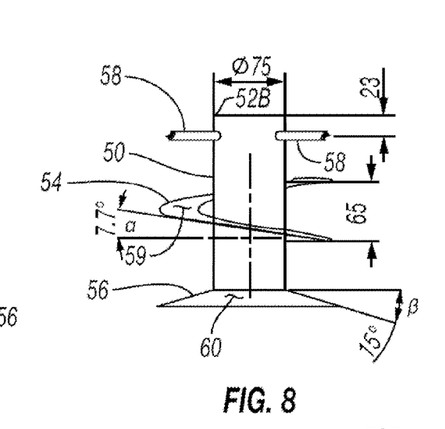
FIG. 8 is an elevational view of the inner cylinder, first guide vane, and second guide vane of the compact flotation unit of FIG. 1.

The first guide vane 54 may extend helically and coaxially about the outer periphery of the inner cylinder 50, defining a radially extending gap 57 (FIG. 4) between the guide vane 54 and the inner cylinder 50. In one configuration, the first guide vane 54 extends approximately three hundred sixty degrees about the inner cylinder 50. It will be appreciated, however, that the first guide vane 54 may extend any number of revolutions, or fractions thereof, about the outer periphery of the inner cylinder 50 within the scope of the present teachings. Referring additionally to FIG. 8, the first guide vane 54 may include a substantially planar surface 59 defining an angle $\alpha$ with the radius of the inner cylinder 50. In one configuration, the angle $\alpha$ is approximately seven and one-tenth degrees, such that the surface 59 slopes radially inward relative to the inner cylinder 50 (i.e., the angle $\alpha$ is seven and one-tenth degrees above a line defined by the radius of the inner cylinder 50 relative to the view in FIG. 1). It will be appreciated, however, that the angle $\alpha$ may have other values within the scope of the present teachings. With particular reference to FIG. 4, the inlet 46 may be located in the tank 12 such that the inlet 46 is axially aligned with a portion of the first guide vane 54. Accordingly, fluid entering the tank 12 in the radial direction through the inlet 46 may define an angle $\sigma$ with the planar surface 59 of the first guide vane 54. The angle $\sigma$ may be substantially equal to the angle $\alpha$, such that the flow of fluid through the compact flotation unit 10 is smooth and/or generally laminar, thus providing enhanced separation of the oil, water, and/or gas.

The second guide vane 56 may extend coaxially about the outer periphery of the inner cylinder 50, and may urge the fluid in the chamber 30 to orbit about the outer periphery of the inner cylinder 50. As illustrated in FIG. 4, the second guide vane 56 may be located axially below the first guide vane 54, such that the second guide vane is located substantially adjacent to the first axial end 52*a* of the inner cylinder 50. In one configuration, the second guide vane 56 extends approximately three hundred sixty degrees about the outer periphery of the inner cylinder 50. It will be appreciated, however, that the second guide vane 56 may extend less than three hundred sixty degrees about the outer periphery of the inner cylinder 50, such that first and second ends 62, 64 of the guide vane 56 define a gap therebetween. The second guide vane 56 may include a substantially planar surface 60 defining an angle $\beta$ with the radius of the inner cylinder 50, as also shown in FIG. 8. The planar surface 60 may be adjacent to the outer periphery of the inner cylinder 50. In one configuration, the angle $\beta$ is approximately fifteen degrees, such that the surface 60 slopes radially outward relative to the inner cylinder 50 (i.e., the angle $\beta$ is fifteen degrees below a line defined by the radius of the inner cylinder 50, relative to the view in FIG. 1). It will be appreciated, however, that the angle $\beta$ may have other values within the scope of the present teachings.

Figure 6:
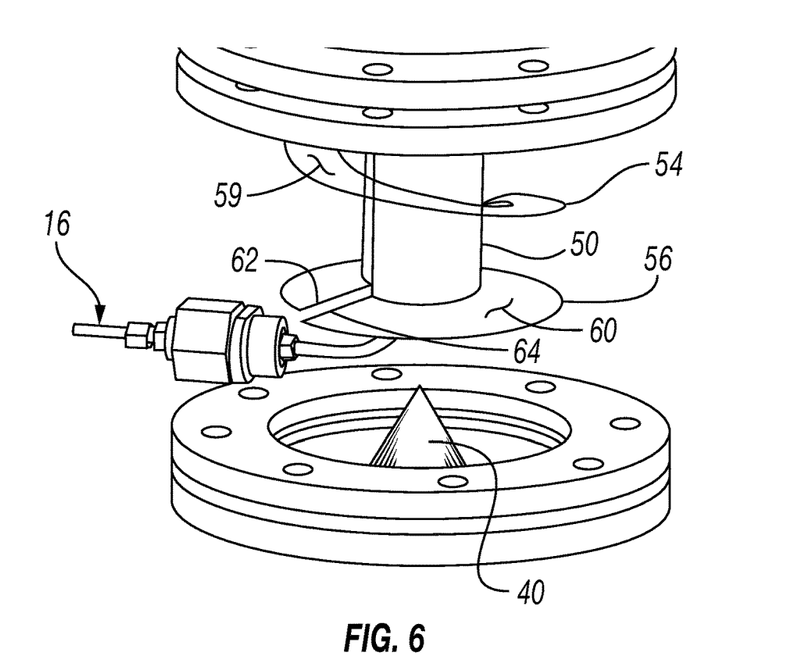
FIG. 6 is a perspective view of an inner cylinder of the compact flotation unit of FIG. 1.
Figure 7:
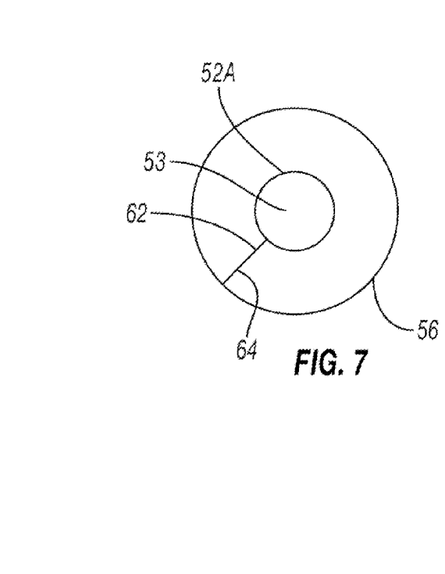
FIG. 7 is a top view of the second guide vane of the compact flotation unit of FIG. 1.

Referring to FIG. 6 for illustration purposes, in some embodiments, the first and second ends, 62 and 64, may overlap. In some other embodiments the first and second ends, 62 and 64, may be orientated in such way that there exists a gap between the first and second ends, 62 and 64, from both an axially extending and circumferentially extending perspective; while in yet other embodiments, the first and second ends, 62 and 64, are aligned from a circumferentially perspective, while there exists an axial gap (such as that shown in FIG. 9 as D1, with the circumferential alignment being shown in FIG. 7).

Figure 9:
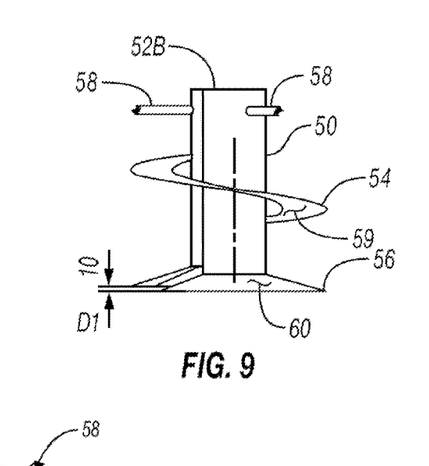
FIG. 9 is a perspective view of the inner cylinder, first guide vane, and second guide vane of the compact flotation unit of FIG. 1.

As illustrated in FIGS. 9 and 11, the second guide vane 56 may extend about the periphery of the inner cylinder 50 in a helical configuration, including any number of revolutions, or fractions thereof, within the scope of the present teachings. In one configuration, the helical configuration of the second guide vane 56 may extend about the outer periphery of the inner cylinder approximately three hundred sixty degrees. The pitch of the second guide vane 56 may be such that the first end 62 of second guide vane 56 is separated or axially offset from the second end 64 of the second guide vane 56 by an axially extending distance D1. In one configuration, the distance D1 may be approximately one centimeter. It will be appreciated, however, that the distance D1 may be more than or less than one centimeter. For example, the distance D1 may be equal or greater than about one tenth of a centimeter and less than about forty centimeters (or any point within this range). The distance D1 separating the first end 62 from the second end 64 may help gas bubbles and oil droplets contained in the fluid within the chamber 30 to move in the second axial direction within the chamber 53 of the inner cylinder 50. Indeed, the second guide vane 56 may be movably coupled to the inner cylinder 50, and the distance D1, or gap, between the first end 62 and second end 64 may mechanically adjust based upon a fluid flow rate through the gap. For example, the distance D1 may increase as the fluid flow rate increases. The shape of the gap between the first end 62 and second end 64 may take any suitable shape, such as a rectangular shape, circular shape, quadratic shape, or a pipe rack shape.

The configuration of the first and second guide vanes 54, 56 allows for a two stage method of separating the oil, gas and water mixture that is provided through the inlet 46. In one stage of the method, the mixture may contact and follow the surface 59 of the first guide fane 54. In another stage of the method, the mixture may contact and follow the surface 60 of the second guide vane 56, before entering the inner cylinder 50 between the first and second ends 62, 64 of the second guide vane. Indeed, the size and shape of the first guide vane 54, second guide vane 56, and inner cylinder 50 may be such that gas bubbles and oil drops entering the inner cylinder have a co-current flow with water toward the discharge tube 16.

Figure 5:
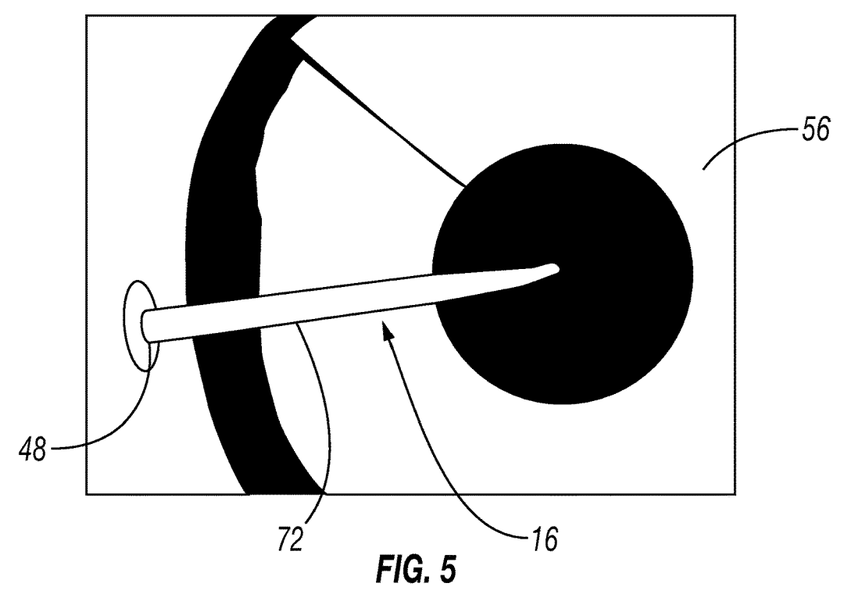
FIG. 5 is a bottom view of an inner cylinder of the compact flotation unit of FIG. 1.

The support arms 58 may generally extend radially between the tank 12 and the inner cylinder 50 to secure and support the inner cylinder 50 within the tank 12. In one configuration, three support arms 58 extend from the second axial end 52*b* of the inner cylinder 50. It will be appreciated, however, that the inner cylinder 50 may include other numbers and configurations of support arms 58 within the scope of the present teachings. For example, as In one illustrative embodiment, with particular reference to FIG. 3, the discharge tube 16 extends between a first end 66 and a second end 68. The first end 66 is in fluid communication with the third outlet 48. As illustrated, although not limited thereto, the discharge tube 16 may be substantially L-shaped, including a first portion 70 and a second portion 72; however any suitable shape of the discharge tube may be used. The first portion 70 may extend in the axial direction within the chamber 53 of the inner cylinder 50, such that the second end 68 of the discharge tube 16 is disposed within, and in fluid communication with, the upper one-half of the inner cylinder 50 (relative to the view in FIG. 3). In one configuration, the second end 68 of the discharge tube 16 is substantially adjacent to the second axial end 52b of the inner cylinder 50. Locating the second end 68 of the discharge tube 16 substantially adjacent to the second axial end 52b of the inner cylinder 50 helps to ensure that the second end 68 is in fluid communication with the gas bubble or air pocket formed within the chamber 53. The joint between the first end 66 and second end 68 of the discharge tube 16 may be radially centered with respect to the second guide vane 56, as shown in FIG. 5, or may instead be adjacent the wall of the cylinder 50, as shown in FIG. 6. Referring again to FIG. 3, it will appreciated that the discharge tube 16 may have other shapes and configurations within the scope of the present disclosure, such that the first end 66 is in fluid communication with the third outlet 48 and the second end is substantially adjacent to the second axial end 52b of the inner cylinder 50.

Figure 1:
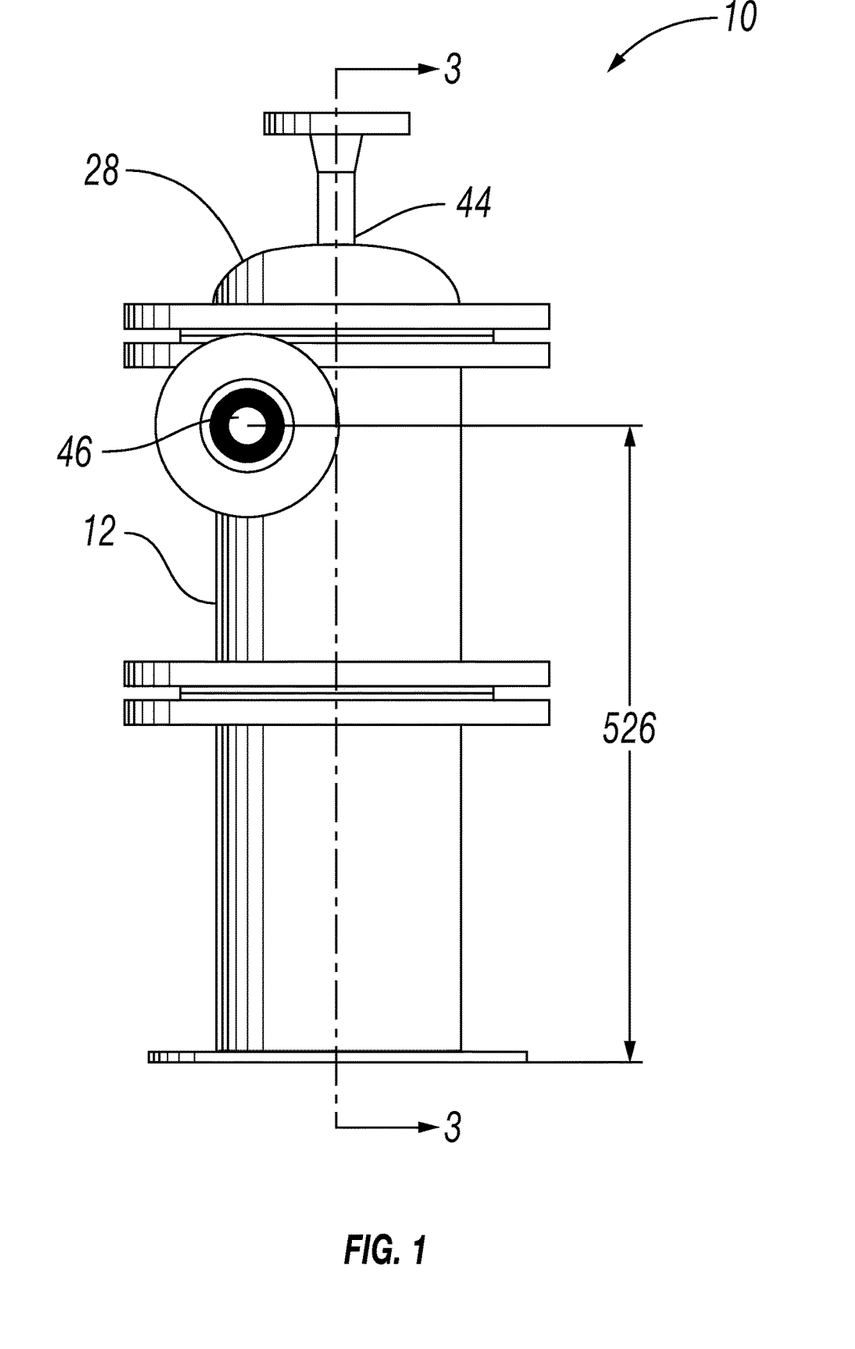
FIG. 1 is a perspective view of a compact flotation unit, in accordance with the present disclosure.
Figure 2:
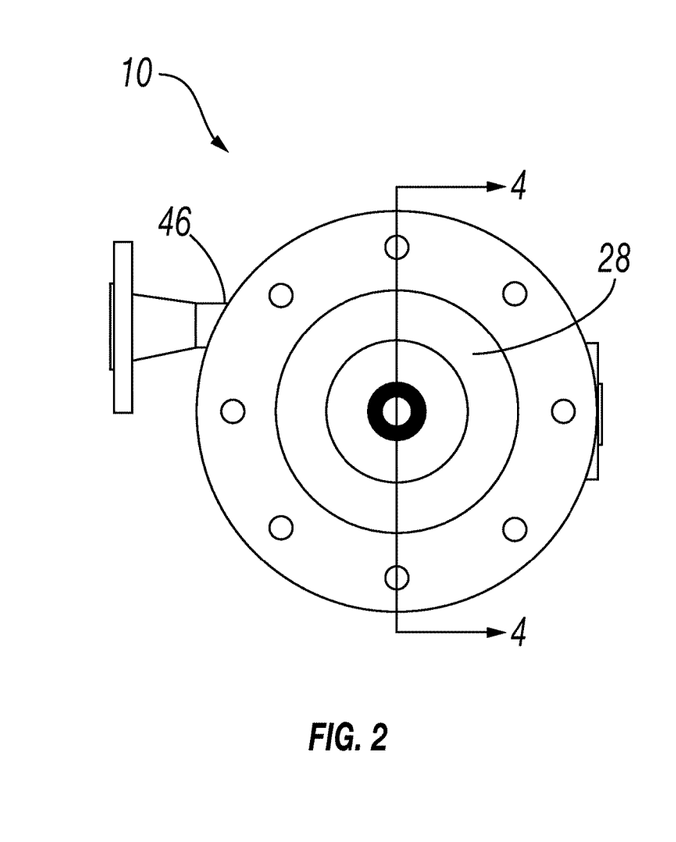
FIG. 2 is a top view of the compact flotation unit of FIG. 1.

Further, as shown in FIGS. 1-3, the tank 12 may be assembled using radially extending flanges. However, any suitable construction technique, or feature, may be used to form the tank 12, including, but not limited to, a single contiguous sealed vessel formed by welding the first and second axial ends 26 and 28, to the cylindrical shape.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus comprising:
   a tank having a fluid inlet;
   a cylinder disposed within the tank and having an open end;
   a first guide vane disposed about the cylinder, the first guide vane having a portion axially aligned with the fluid inlet, wherein the first guide vane slopes radially inwardly relative to the cylinder; and
   a second guide vane disposed about the cylinder adjacent the open end thereof and including a first end and a second end, the first end of the second guide vane being axially offset from the second end of the second guide vane, wherein the first and second guide vanes are helical in shape; the second guide vane slopes radially outwardly relative to the cylinder; and wherein the first guide vane has a helical pitch greater than a helical pitch of the second guide vane.

2. The apparatus of claim 1, wherein the first and second guide vanes extend an equal amount outwardly from the cylinder.

3. The apparatus of claim 1, wherein the first guide vane extends coaxially about an outer periphery of the cylinder, defining a radially extending gap between the first guide vane and the cylinder.

4. The apparatus of claim 1, wherein the first guide vane has a substantially planar surface defining an angle with respect to a radius of the cylinder.

5. The apparatus of claim 4, wherein the fluid inlet is shaped such that fluid entering the tank therethrough defines an angle with respect to the substantially planar surface of the first guide vane that is substantially equal to the angle defined by the substantially planar surface with respect to a radius of the cylinder.

6. The apparatus of claim 1, wherein the second guide vane extends from an outer periphery of the cylinder.

7. The apparatus of claim 1, wherein the first end of the second guide vane overlaps the second end of the second guide vane.

8. The apparatus of claim 1, wherein the first end of the second guide vane defines an axial and circumferential gap with respect to the second end of the second guide vane.

9. The apparatus of claim 1, wherein the first end of the second guide vane is axially aligned with the second end of the second guide vane but circumferentially spaced apart therefrom.

10. The apparatus of claim 1, wherein the second guide vane has a substantially planar surface defining an angle with respect to a radius of the cylinder.

11. The apparatus of claim 1, wherein the tank has a top and a bottom; wherein the cylinder also has a closed end; and wherein the cylinder is disposed within the tank such that the closed end thereof is adjacent to, and spaced apart from, the top of the tank.

12. The apparatus of claim 1, wherein the tank has a fluid outlet; further comprising a discharge tube at least partially disposed within the cylinder and in fluid communication with the fluid outlet; and wherein the first guide vane, the second guide vane, and the cylinder are shaped and disposed with respect to each other such that gas bubbles and oil drops entering the cylinder have a co-current flow with water toward the discharge tube.

13. The apparatus of claim 1, wherein the second guide vane is movably coupled to the cylinder; wherein the axial offset between the first end of the second guide vane and the second end of the second guide vane defines an adjustable gap.

14. A method comprising:
    accepting flow of a mixture comprising water, a hydrocarbon containing liquid not miscible with the water, and a gas through a pipeline;
    separating the hydrocarbon containing liquid and the gas from the water by feeding the mixture through an apparatus comprising:
    a tank having a fluid inlet in fluid communication with the pipeline and at least one fluid outlet,
    a cylinder disposed within the tank and having an open end,
    a first guide vane disposed about the cylinder, the first guide vane having a portion axially aligned with the fluid inlet, wherein the first guide vane slopes radially inwardly relative to the cylinder, and
    a second guide vane disposed about the cylinder adjacent the open end thereof and including a first end and a second end, the first end of the second guide vane being axially offset from the second end of the second guide vane, the second guide vane having a pitch less than a pitch of the first guide vane, and the second guide vane sloping radially outwardly relative to the cylinder; and
    expelling at least one of a portion of the gas and the hydrocarbon containing liquid from the cylinder through a discharge tube at least partially disposed within the cylinder in fluid communication with the at least one fluid outlet.

15. The method of claim 14, wherein the second guide vane has a substantially planar surface defining an angle with respect to a radius of the cylinder.

16. A compact flotation unit comprising:
a tank having a fluid inlet;
a cylinder disposed within the tank and having an open end and a closed end, the disposition of the cylinder within the tank being such that during operation, the closed end of the cylinder is below a surface of fluid within the tank;
a first helical guide vane disposed about the cylinder and having a substantially planar surface defining an angle with respect to a radius of a portion of the cylinder axially aligned with the fluid inlet such that the substantially planar surface slopes radially inwardly relative to the cylinder, wherein the fluid inlet is shaped such that fluid entering the tank therethrough defines an angle with respect to the substantially planar surface of the first guide vane that is substantially equal to the angle defined with by the substantially planar surface with respect to the radius of the cylinder; and
a second guide vane disposed about the cylinder adjacent the open end thereof and including a first end and a second end, the first end of the second guide vane being axially offset from the second end of the second guide vane, wherein the second guide vane has a substantially planar surface defining an angle with respect to-a radius of the cylinder such that the substantially planar surface slopes radially outwardly relative to the cylinder, the first guide vane having a pitch greater than a pitch of the second guide vane.

17. The compact flotation unit of claim 16, wherein the first and second guide vanes are helical in shape.

18. The compact flotation unit of claim 16, wherein the first and second guide vanes extend an equal amount outwardly from the cylinder.

19. The compact flotation unit of claim 16, wherein the first guide vane extends coaxially about an outer periphery of the cylinder, defining a radially extending gap between the first guide vane and the cylinder.

* * * * *